US010864650B2

(12) United States Patent
Putch et al.

(10) Patent No.: US 10,864,650 B2
(45) Date of Patent: Dec. 15, 2020

(54) APPARATUS AND METHOD FOR DIE CUTTING

(71) Applicants: Phoenix Partners, LLC, Millville, NJ (US); Dicar Inc., Pine Brook, NJ (US)

(72) Inventors: Richard Putch, Marlboro, NJ (US); Robert Weidhaas, Jr., Homosassa, FL (US)

(73) Assignees: Phoenix Partners, LLC, Millville, NJ (US); Dicar Inc., Pine Brook, NJ (US)

( * ) Notice: Subject to any disclaimer, the term of this patent is extended or adjusted under 35 U.S.C. 154(b) by 18 days.

(21) Appl. No.: 16/060,198

(22) PCT Filed: Dec. 9, 2016

(86) PCT No.: PCT/US2016/065753
§ 371 (c)(1),
(2) Date: Jun. 7, 2018

(87) PCT Pub. No.: WO2017/100527
PCT Pub. Date: Jun. 15, 2017

(65) Prior Publication Data

US 2018/0370064 A1 Dec. 27, 2018

Related U.S. Application Data

(60) Provisional application No. 62/265,217, filed on Dec. 9, 2015.

(51) Int. Cl.
*B62D 7/20* (2006.01)
*B26F 1/44* (2006.01)
(Continued)

(52) U.S. Cl.
CPC .............. *B26F 1/40* (2013.01); *B26D 1/0006* (2013.01); *B26D 1/305* (2013.01); *B26D 7/20* (2013.01);
(Continued)

(58) Field of Classification Search
CPC .. B26F 1/40; B26F 2001/4454; B26D 1/0006; B26D 1/305; B26D 7/20
(Continued)

(56) References Cited

U.S. PATENT DOCUMENTS 2,912,388 A 11/1959 Leahy et al.
3,237,499 A * 3/1966 Lohrand ................ A21C 11/10 83/510

(Continued)

FOREIGN PATENT DOCUMENTS

JP S45001395 B 1/1970
JP S58082700 A 5/1983

(Continued)

OTHER PUBLICATIONS

International Search Report and Written Opinion received in PCT/US16/65753 dated Jun. 5, 2017; pp. 8.

(Continued)

*Primary Examiner* — Kenneth E Peterson
*Assistant Examiner* — Nhat Chieu Q Do
(74) *Attorney, Agent, or Firm* — Zhong Law, LLC

(57) ABSTRACT

A clamshell die press includes a fixed platen, a moving platen installed thereon a cutting blade, and a pad mounted on top of a working surface of the fixed platen, wherein the pad comprises a padding block, wherein the padding block comprises a padding layer composed of a material selected to match a tooth profile of the cutting blade.

12 Claims, 7 Drawing Sheets

(51) Int. Cl.
*B26F 1/40* (2006.01)
*B26D 1/30* (2006.01)
*B26D 1/00* (2006.01)
*B26D 7/20* (2006.01)

(52) U.S. Cl.
CPC .......... *B26F 1/44* (2013.01); *B26D 2001/006* (2013.01); *B26F 2001/4436* (2013.01); *B26F 2001/4445* (2013.01); *B26F 2001/4472* (2013.01)

(58) Field of Classification Search
USPC ........ 83/628, 619, 698.91, 699.11, 531–541, 83/652–657, 302, 303, 343, 346, 37, 408, 83/423, 903, 920, 659
See application file for complete search history.

(56) References Cited

U.S. PATENT DOCUMENTS

| | | | | | |
|---|---|---|---|---|---|
| 3,277,764 | A * | 10/1966 | Henc | B26F 1/44 | 83/679 |
| 3,566,736 | A * | 3/1971 | Johnson | A61B 5/04023 | 83/510 |
| 3,626,800 | A | 12/1971 | Newton, Jr. et al. | | |
| 3,782,166 | A * | 1/1974 | Whistler, Jr. | B21D 37/04 | 72/462 |
| 3,855,892 | A | 12/1974 | Dilello et al. | | |
| 3,986,379 | A * | 10/1976 | Mansell | B21D 5/01 | 72/57 |
| 4,275,629 | A * | 6/1981 | McDowell | B23D 25/12 | 83/302 |
| 5,152,204 | A * | 10/1992 | Trevizo | B26D 7/2614 | 100/233 |
| 5,172,622 | A * | 12/1992 | Sabin | B23D 35/008 | 83/146 |
| 5,778,748 | A * | 7/1998 | Beijen | B26D 5/08 | 83/529 |
| 5,916,346 | A | 6/1999 | Neal | | |
| 6,279,443 | B1 * | 8/2001 | Nakahara | B26D 1/0006 | 83/346 |
| 6,341,557 | B1 | 1/2002 | Hutchison et al. | | |
| 6,470,779 | B1 * | 10/2002 | Gannon | B23D 35/008 | 83/541 |
| 6,997,092 | B2 * | 2/2006 | Lin | B26F 1/40 | 83/378 |
| 7,971,513 | B2 * | 7/2011 | Chan | B26F 1/36 | 83/621 |
| 2004/0112196 | A1 | 6/2004 | Corcoran et al. | | |

FOREIGN PATENT DOCUMENTS

| | | | |
|---|---|---|---|
| JP | 2003340789 | A | 12/2003 |
| JP | 2004527389 | A | 9/2004 |

OTHER PUBLICATIONS

European Application No. 16873893.8, Extended European Search Report dated Jul. 3, 2019, 6 pages.
Japanese Application No. 2018-549765, Japanese Office Action dated Sep. 23, 2020, 5 pages.

* cited by examiner

600

APPARATUS AND METHOD FOR DIE CUTTING

CROSS-REFERENCE TO RELATED APPLICATIONS

This application claims the benefit of U.S. Provisional Application No. 62/265,217 filed on Dec. 9, 2015 and the PCT Application No. PCT/2016/065753 filed on Dec. 9, 2016, the contents of which are hereby incorporated by reference.

TECHNICAL FIELD

This disclosure relates to apparatus and method of die cutting, in particular to relating to a clamshell die press.

BACKGROUND

Clamshell die presses are often used to cut substrate work pieces, such as cardboards, plastic sheets, corrugated boards etc., into products of different shapes. These products can be used for different commercial purposes. A clamshell die press may include a frame (or base) for supporting a pair of platens made of steel. The pair of platens may include a fixed platen that is secured to the frame, and a moving platen that moves along a track between a fully open (an inoperative) position and a substantially close (an operative) position relative to the fixed platen. The fixed platen may provide a substantially flat working surface on which the work pieces to be cut are placed. An inner surface of the moving platen may include mounting points at which tooling can be mounted. The tooling can be the cutting blades that may cut the work pieces placed on the working surface of the fixed platen at the operative position. At the inoperative position, one end of the moving platen is pushed away from the fixed platen to allow an operator to place a work piece on the fixed platen. At the operative position, the moving platen is pushed down towards the fixed platen with force to enable the tooling to cut through the work piece, thus forming the products.

BRIEF DESCRIPTION OF THE DRAWINGS

The present disclosure is illustrated by way of example, and not by way of limitation, in the figures of the accompanying drawings.

DETAILED DESCRIPTION

Figure 1:
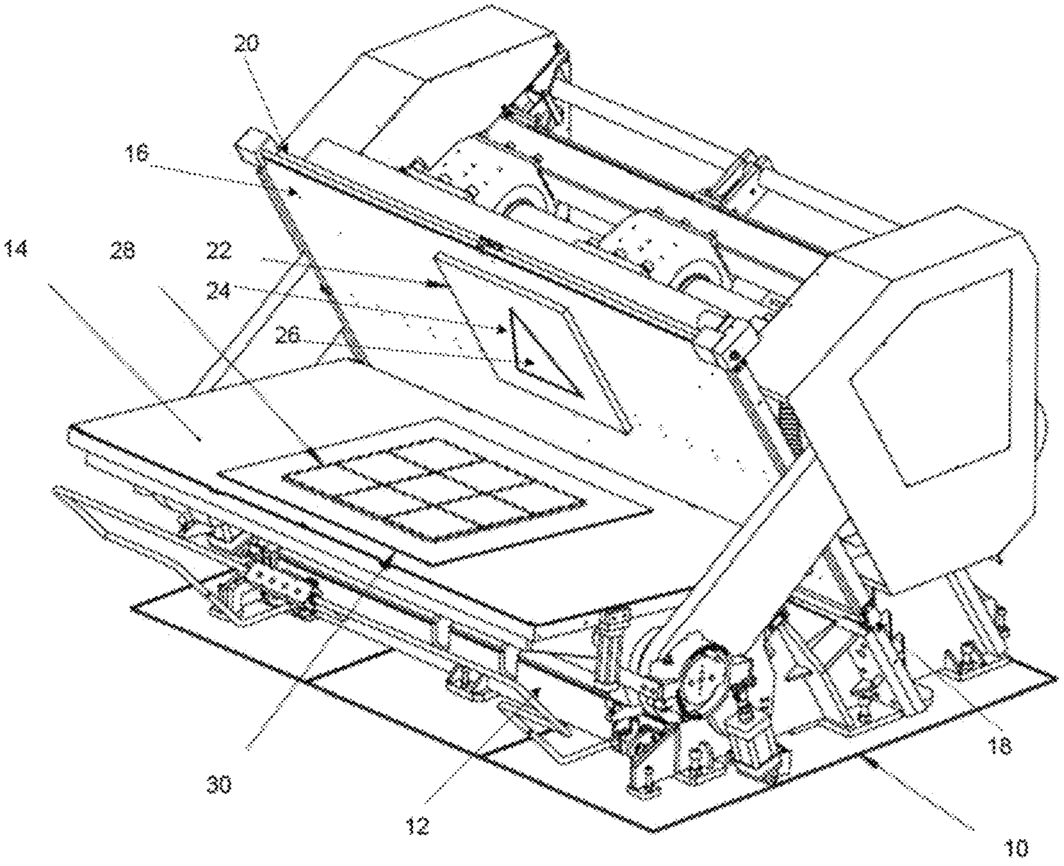
FIG. 1 illustrates a clamshell die press according to an embodiment of the present disclosure.

The current die presses use steel blades having certain tooth profiles to cut through work pieces. During cutting, the steel blades are pressed with force (measured in tonnages) against a work piece. The downward force can cause steal blades cutting through the work piece until the blades strike against (i.e., contact with force) the working surface of the fixed platen. To make a clean cut, it is desirable for the steel blades to apply an even pressure on the work piece until the work piece is cut evenly and cleanly. By pressing the moving platen against the fixed platen, the steel blades compress the work piece until an explosion (clean cut) occurs. To create an even and level load so as to achieve the cut through, an operator needs to prepare a flat working surface on the fixed platen because the working surface can become uneven (due to knife wears) and the uneven working surface may cause unclean cuts at those uneven areas. The preparation process may take anywhere from 30 to 180 minutes or more of the operator's time.

Additionally, the current steel-to-steel cut can generate high-pitch and high-decibel noise at the explosion. This noise associated with die cutting is a type of working hazard for the die press operator. Also, current die cutting requires the application of a high-tonnage force to compress the work piece against the working surface of the fixed platen. The generation of the high-tonnage force consumes a large amount of energy. Therefore, there is a need to improve the current die cutting.

Instead of the hard steel-to-steel die cutting as currently used in clamshell die presses, embodiments of the present disclosure provide a soft die cutting system that includes a set of soft padding blocks. These padding blocks may be configured into a pad mounted on the top of the working surface of the fixed platen. Each padding block may include a steel backing and a padding layer bonded to the steel backing. The steel backing, when mounted, may be affixed to the working surface of the fixed platen using binding agents (e.g., a magnetic layer) while the padding layer faces the direction of the moving platen or the blades. One or more pieces of padding blocks may be placed on the working surface of the fixed platen to form a pad on top of the fixed platen. The padding blocks may be arranged in a variety of combinations to form the pads of different shapes, thus covering different areas on the working surface. Work pieces to be cut may be placed on the pad formed by the padding blocks to enable a soft cut of the work pieces.

Since padding blocks may be easily rearranged into pads having different area coverages, the time required to provide the cutting surface on the fixed platen is significantly reduced, compared to the time traditionally spent on preparing the working surface of the fixed platen. Further, because the blades of the die cutter may cut through the work pieces into the soft padding layers of the padding blocks, the press load (or pressing force tonnage) needed for cutting various substrates may be significantly reduced. The deeper cuts into the soft padding layers can result in cleaner cuts (i.e., fewer angel hairs attached to the products). Further, because of the soft padding layer, the steel blades do not directly scratch the working surface of the fixed platen, the noise associated with the die cutting can be reduced significantly, thus improving the working environment for the die press operators.

FIG. 1 illustrates a clamshell die press 10 according to an embodiment of the present disclosure. As shown in FIG. 1, the die press 10 may include a frame 12, a fixed platen 14, and a moving platen 16. Die press 10 may be secured to the ground through frame 12, and fixed platen 14 may be securely mounted onto frame 12. Fixed platen 14 may be made of steel and may provide a substantially level working surface with respect to the ground. Moving platen 16 may include a first end 18 that is engaged with a track and a second free end 20 can be in an open position or a close position with respect to the working surface of fixed platen 14. At the open position, the free end 20 of the moving platen 16 is away from fixed platen 14, whereas at the close position, the free end 20 of the moving platen 16 is pushed to the fixed platen 14 to enable an inner surface of moving platen 16 substantially parallel to the working surface of the fixed platen 14. While at the close position, there is a gap space between the working surface of fixed platen 14 and the inner surface of moving platen 16. In one embodiment, die press 10 may be a regular clamshell press that has a small gap of approximately one to one and half inches. In another embodiment, die press 10 may be a Widemouth™ die press that has an adjustable gap between one and three inches.

Moving platen 16 may be transitioned by an operator between the open position and the close position via a track path using gears and arms. In one embodiment, tooling 22 may be installed on the inner surface (i.e., the surface of moving platen 16 that faces the working surface of fixed platen 14) for die cutting. Tooling 22 may include steel blades 24 and rubber ejections 26 that surround the steel blades 24. Steel blades 24 may be installed on the inner surface of moving platen 16 to create different cutting patterns. During die cutting, steel blades 24 may cut work pieces into products of different shapes, while the rubber ejections 26 may help release the finished products from the steel blades 24.

In one embodiment, instead of mounting work pieces directly onto the working surface of fixed platen 14, a soft pad 28 may be mounted on the working surface of fixed platen 14 to provide a soft cutting surface to blades 24. Pad 28 may be formed by mounting one or more padding blocks 28 on the working surface of fixed platen 14. In one embodiment, padding blocks 28 used to form pad 28 may have substantially the same geometric contour shape. In another embodiment, padding blocks 28 used to form pad 28 may have different contour shapes. Different combinations of padding blocks 28 (of the same shape or different shapes) may produce pad 28 covering different areas on the working surface of fixed platen 14.

Figure 2:
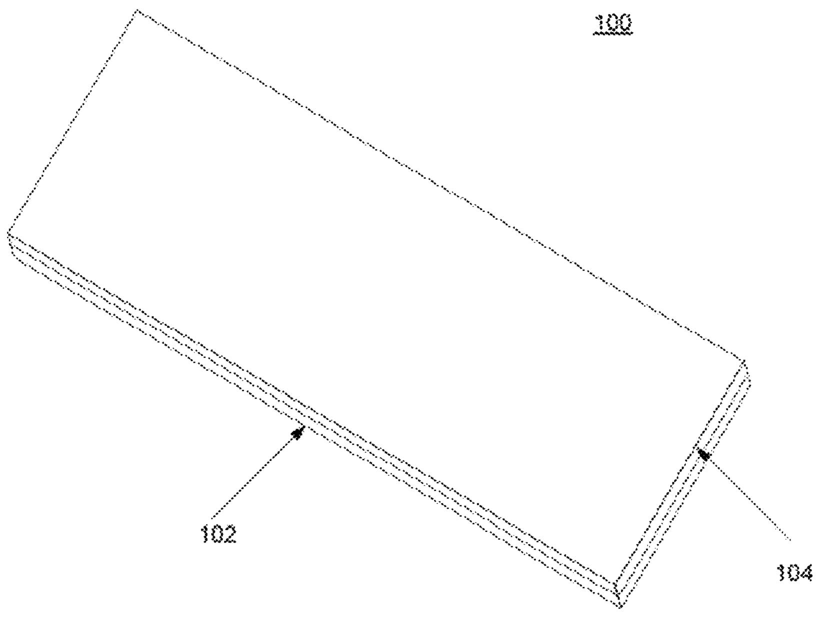
FIG. 2 illustrates a padding block according to an embodiment of the present disclosure.

FIG. 2 illustrates a padding block 100 according to an embodiment of the present disclosure. Padding block 100 can have different contour shapes. In one embodiment as shown in FIG. 2, the edge contour of padding block 100 may be rectangular. In other embodiments, the edge contour of padding block 100 may be other geometric shapes including, for example, triangles, squares, and circles.

Padding block 100 may include two or more layers composed of different materials. In one embodiment, as shown in FIG. 2, padding block 100 may include a backing layer 102 and a padding layer 104. Backing layer 102 may be composed of hard metals such as steel. Padding layers 104 may be composed of softer materials such as, for example, Urethane, rubber, ultra-high-molecular-weight (UHMW) polyethylene, or other materials that have a hardness measurement in terms of Shore durometer ranging from 30 A to 85 D. The materials of the padding layer 104 are softer than the blades, and allow the blades cut into the padding layer 104. Padding layer 104 can be bonded to backing layer 102 by chemical reaction. For example, padding layer 104 may be bonded to steel backing layer 102 by using heat-activated adhesive chemical agents. Once bonded, padding layer 104 is secured to backing layer 102.

Figure 3:
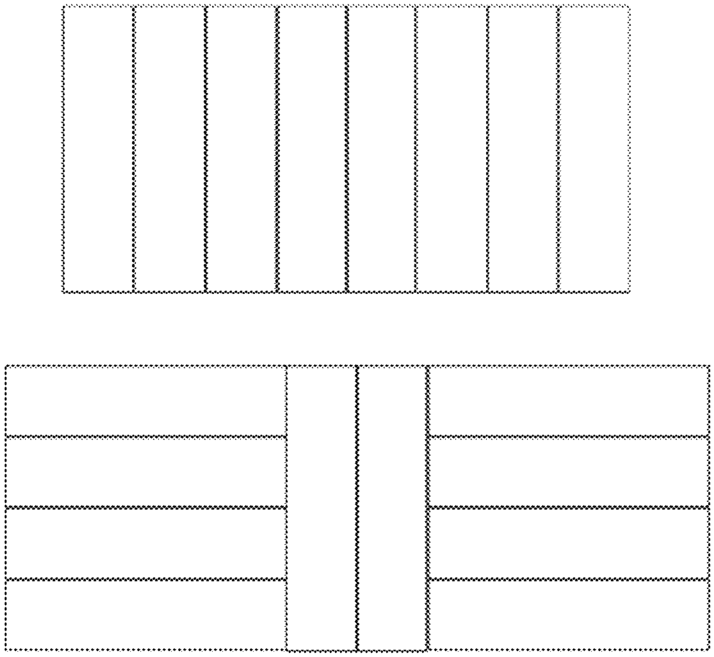
FIG. 3 illustrates some exemplary arrangements of padding blocks.

Different combinations of padding blocks 100 may form pad 28 covering areas of different contour shapes. FIG. 3 illustrates some exemplary arrangements of padding blocks 100. These arrangements of padding blocks can form pads of different shapes. Because the padding blocks 100 can be conveniently mounted at different locations on the working surface of the fixed platen 14, the time to prepare and make ready the cutting surface can be reduced significantly. The time to prepare the cutting surface now includes the time to mount and/or reposition the padding blocks but without the need to level the surface of the fixed platen 14. Further, the impression force applied by the die press 10 to padding blocks 28 may be experimented with (e.g., increasing incrementally) until satisfactory cuts on work pieces are achieved. This process to adjust the impression force typically takes no more than two minutes. Thus, the soft cut system may significantly reduce the time to start the operation of die press 10.

The steel backing layer 102 of padding blocks may be used to secure padding blocks 100 onto the fixed platen 14. For example, magnetic force may be used to secure padding blocks 100 to the fixed platen 14. As shown in FIG. 1, in one embodiment, a thin, double-sided magnetic layer 30 may be used to provide the magnetic force to secure the metal backing layers of padding blocks to fixed platen 14. Magnetic layer 30 may be mounted on the working surface of fixed platen 14, and padding blocks 100 may be mounted on top of magnetic layer 30 so as to bind pad 28 formed by padding blocks 100 to the fixed platen 14 with the magnetic force. In addition, metal backing layer 102 may also provide a backbone for the soft material of padding layer 104 to prevent distortion during die cut. In another embodiment, backing layer 102 may be composed of magnetized metal (e.g., magnetized steel). The magnetized backing layer 102 may be mounted onto a metal working surface of fixed platen 14, secured by the magnetic force.

Padding layer 104 of padding blocks 100 may be composed of different types of materials that have a variety of hardness measurements. Thus, padding blocks having padding layers of different hardness measurements may be employed to form pad 28. In one embodiment, the type (i.e., hardness of the padding layer) of padding blocks may be selected based on the tooth profiles of the blades 24 and/or the material of the work pieces being cut. The type of padding blocks 100 is selected to enable a match of the hardness of padding layer with the tooth profiles of blades 24 so that the match may produce the optimal cutting results.

Figure 4A:
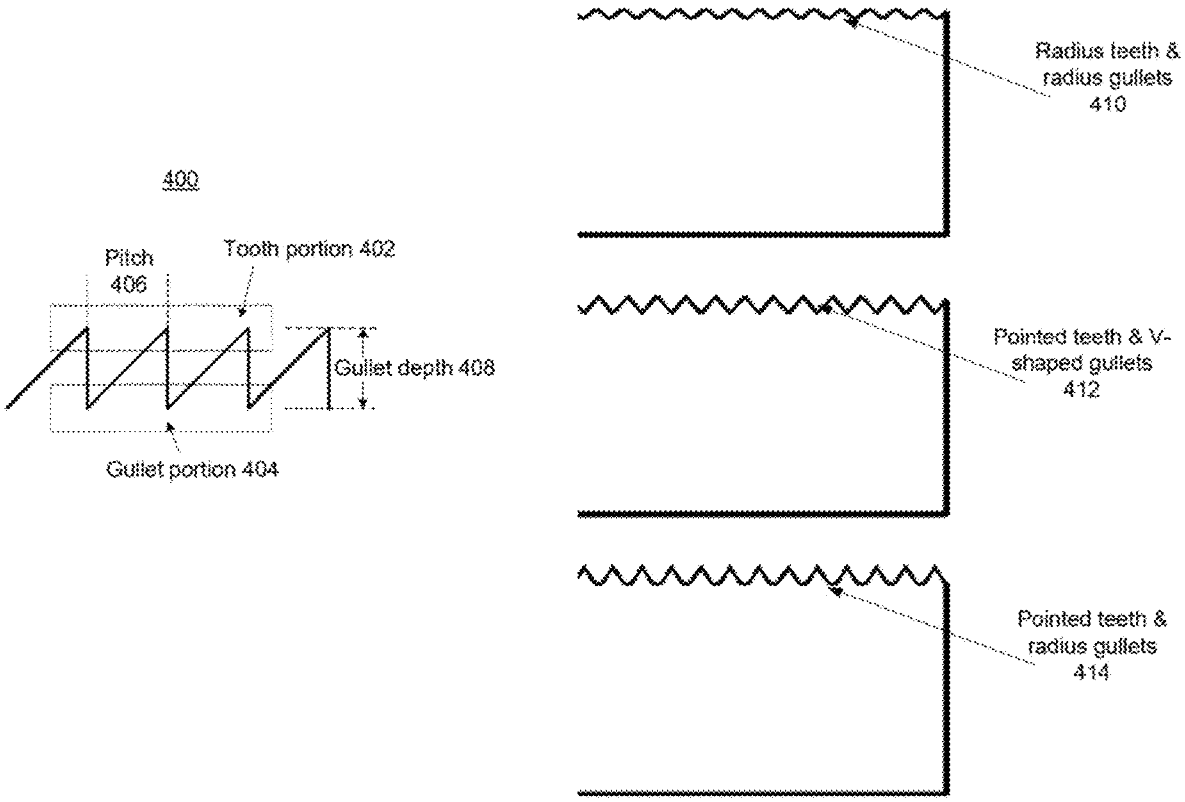
FIG. 4A illustrates some blade profiles that may be used in steel rule die cut.

For example, in steel rule die cut, blades may be specified according to a tooth profile including certain geometrical properties of the blade. FIG. 4A illustrates some blade profiles that may be used in steel rule die cut. As shown in FIG. 4A, a tooth profile 400 may include a tooth portion 402 and a gullet portion 404. The tooth portion 402 includes tooth tips that can cut into work pieces, and the gullet portion 404 includes the curved area at the base of the teeth. The tooth profile 400 may be associated with certain geometrical properties that may determine how the blade cuts into work pieces. For example, the tooth profile may include a tooth pitch 406 that measures the distance from the tip of one tooth to the tip of the next tooth, and a gullet depth 408 that measures the distance between the tooth tip and the bottom point of the gullet. Further, tooth profile may include different contour shapes for the teeth and gullets of the blade. As shown in FIG. 4A, for example, the blade may include, but not limited to, radius teeth and radius gullets 410, pointed teeth and V-shaped gullets 412, and pointed teeth and radius gullets 414. All these properties associated with tooth profile 400 may be used as parameters that determine the hardness measurement of the padding layer that best matches the blade.

Figure 4B:
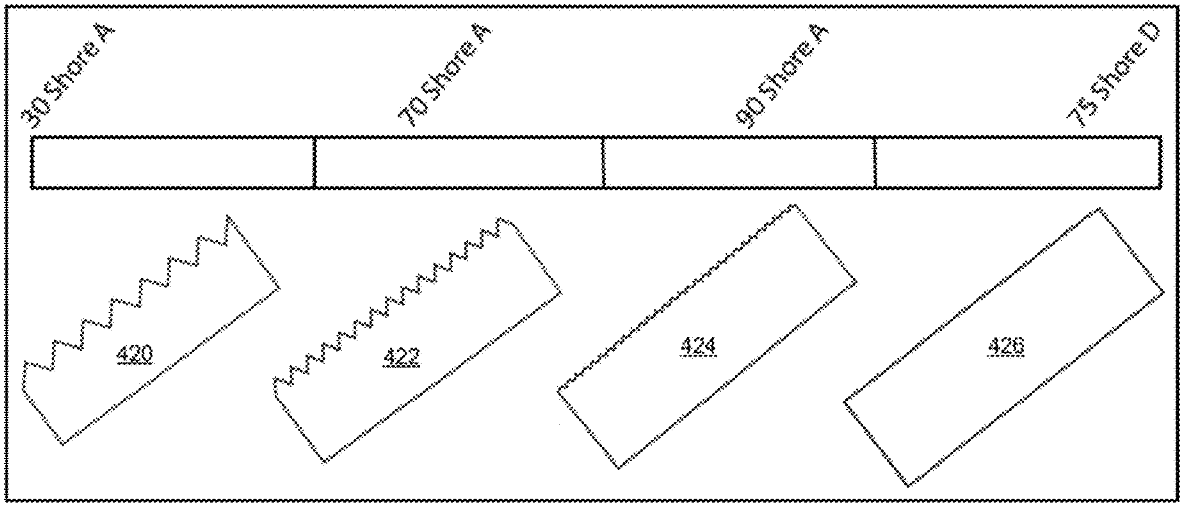
FIG. 4B exemplary tooth profiles and padding layers with matching hardness measurements according to an embodiment of the present disclosure.

The geometrical properties of tooth profile 400 may be used to determine the pad that best matches to the tooth profile. To prepare for die cuts, the tooth profile may be selected to provide the desired edge quality on the work pieces using the least cutting force. Then, the hardness of the padding layer may be selected to match the tooth profile of the blades being used. FIG. 4B shows exemplary tooth profiles and padding layers with matching hardness measurements according to an embodiment of the present disclosure. As shown in FIG. 4B, large toothed profile 420 may be matched a padding layer composed of materials measured at approximately 30 Shore A; an intermediate-sized toothed profile 422 may be matched a padding layer composed of materials measured at approximately 70 Shore A; a small toothed profile 424 may be matched a padding layer composed of materials measured at approximately 90 Shore A; an almost flat-toothed profile 426 may be matched a padding layer composed of materials measured at approximately 75 Shore D. Thus, the types of padding blocks (i.e., the hardness measurement of the padding layer) can be selected based, in part, on the tooth profile of the blades.

In one embodiment, pad 28 may be formed on the working surface of fixed platen 14 using a combination of different types of padding blocks 100. This combination of different types of padding blocks may be particularly useful when blades having different profiles are installed on the inner surface of moving platen 16 to cut work pieces. Thus, the types of padding blocks may be selected to match the blades used to cut particular regions of the work piece.

Because different types of padding layers may be employed to provide cutting surfaces of different hardness measurements with respect to different types of blades, the soft cut system of the present disclosure may broaden the range of work piece materials that can be cut and improve the quality of cuts compared to the current steel-to-steel die cut systems. The soft cut system allows a new range of work piece materials to be cut, including, for example, foam boards and structural paper panels. These materials were traditionally cut by the slow process of plotter tables rather than clamshell die presses. The soft cut system as described in this disclosure may improve the productivity (up to 60 times) over the traditional process using plotter tables.

The interchangeable padding blocks 100 of the soft cut system can also reduce wears on the blades and allow blades of a wider range of tooth profiles to be used because the blades can now cut into the soft surface of the padding layers of the padding blocks. Because the blade cuts into a softer padding layer and does not scratch a cutting surface that is at least as hard as the blade, the wears to the blade is significantly reduced. As such, the useful lives of blades used in the context of the soft cut system can be prolonged, thus reducing the cost for die cut. Further, by cutting against the soft padding layer rather than scratching the hard cutting surface of the fixed platen, the blades do not generate the hazardous noise level while cutting work pieces. The soft cut system further allows for a shear cut motion. The shear cut requires less tonnage for cutting through. The soft cut system can control the depth of the tooth profile cutting into the padding layer to enable precision cuts.

The soft cut system also allows die cutting of multiple layers of work pieces. To cut multiple layers of work pieces, die press may need to increase the tonnage of pressing force applied by the moving platen. The higher tonnage of pressing force may cause damage to the blades when they strike the hard surface of the fixed platen. Thus, the steel-to-steel die cut typically allows die cutting of only a single layer of work piece. In contrast, blades of the die press including the soft cut system as described in the present disclosure cut into the soft material of the padding layer, thus permitting the higher force used in multiple-layer die cutting. For example, the soft cut system can be used to cut up to ten layers of a graphic decal in one press cycle as opposed to only one layer per cycle. Thus, the soft cut system may significantly increase the productivity of clamshell die presses.

Figure 5:
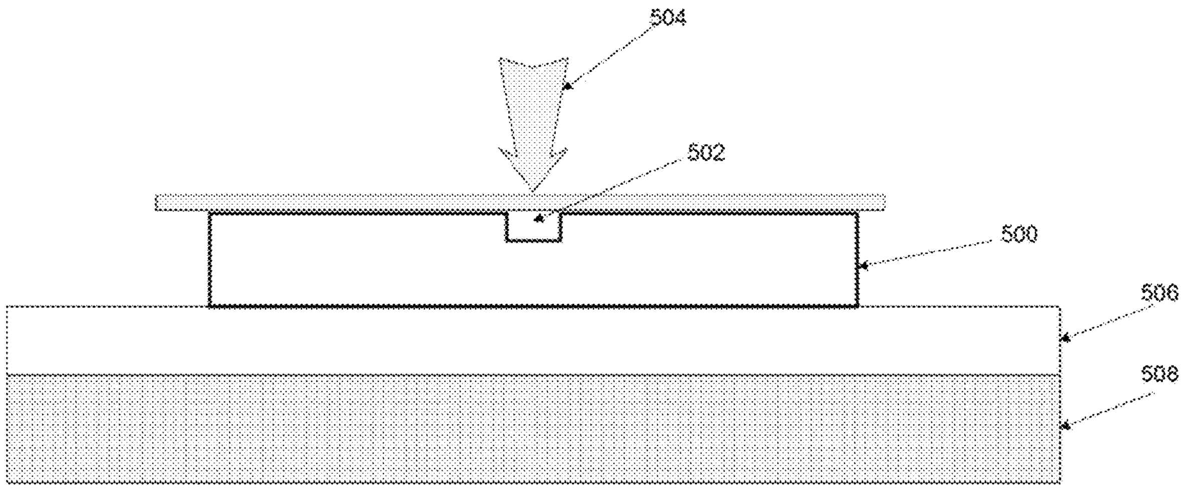
FIG. 5 shows a creasing matrix used in the soft cut system according to an embodiment of the present disclosure.

In one embodiment, a creasing matrix may be mounted on top of the pad 28. The creasing matrix is a hardware module including channels which a die tooling may press against to create creases on (rather than cutting through) the work pieces. FIG. 5 shows a creasing matrix 500 used in conjunction with the soft cut system according to an embodiment of the present disclosure. Creasing matrix 500 can be made of composition materials such as, for example, an extruded polymer or vulcanized fiberboard. As shown in FIG. 5, creasing matrix 500 may include a channel 502. A creasing tooling, such as a blunt tooling 504 may press against a work piece into channel 502 to create creases in the work piece. In one embodiment, a pad 506 may be bonded to a fixed platen 508 of a die press using magnetic force, and creasing matrix 500 may be adhesively attached on to the top surface of pad 506.

Figure 6:
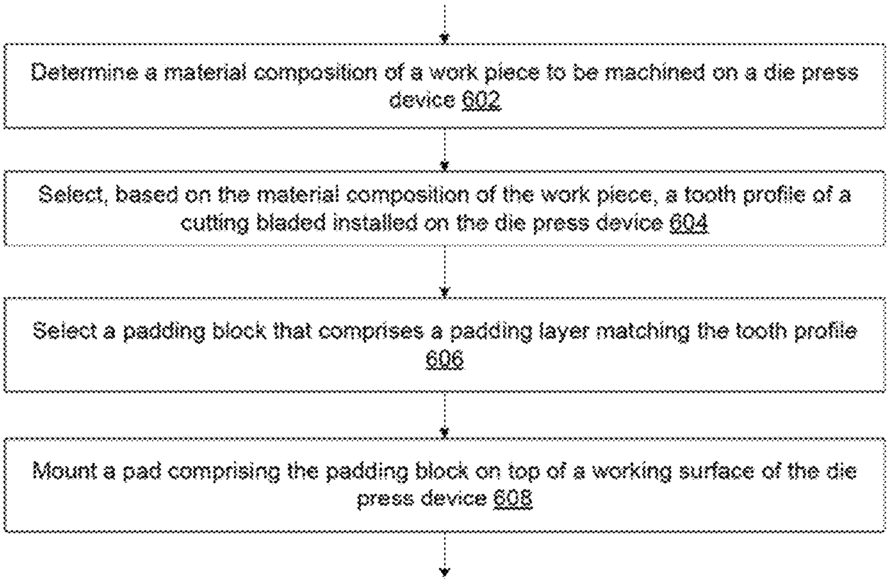
FIG. 6 illustrates an exemplary process for using the soft cut system in die press according to an embodiment of the present disclosure.

FIG. 6 illustrates an exemplary process 600 for using the soft cut system in die press according to an embodiment of the present disclosure. As discussed above, a die press may be a clamshell die press including a fixed platen and a moving platen. At 602, the material of a work piece to be cut may be determined. The material of the work piece may be cardboard, plastic sheet, corrugated board, foam board, structural paper panels etc. In addition to determining the material of the work piece, certain physical properties of the work piece, such as the thickness and dimensions of the work piece, can be determined.

At 604, in response to determining properties of the work piece, die cut blades of certain tooth profile may be selected based on these properties of the work piece. The tooth profile may be selected based on the material of the work piece and depth that needs to be cut.

At 606, in response to determining properties of the work piece and selecting the die cut blades, the padding blocks may be selected to match the properties of the work piece and the tooth profile of the die cut blades. The padding blocks may be selected to enable an optimal match between the hardness of the padding layer and the tooth profile of the cutting blades.

At 608, in response to selecting the padding blocks, the selected padding blocks may be secured to the fixed platen. In one embodiment, the selected padding blocks may be secured to the fixed platen using a magnetic layer (e.g., a double-sided magnetic mat) to enable the bonding of padding blocks to the fixed platen. In one embodiment, rather than covering the whole surface of the fixed platen, the pad including the selected padding blocks covers only portions of the whole surface. For example, the pad may cover certain areas that receive the cutting blades during the die cut. After installation of the pad on the fixed platen and installation of the tooling including the cut blades, an operator may start operating the die press to cut work pieces.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "an embodiment" or "an implementation" or "one implementation" throughout is not intended to mean the same embodiment or implementation unless described as such.

Reference throughout this specification to "an embodiment" or "an embodiment" means that a particular feature, structure, or characteristic described in connection with the embodiment is included in at least an embodiment. Thus, the appearance of the phrases "in an embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A clamshell die press system, comprising:

a clamshell die press comprising:

a fixed platen; and a moving platen; and accessory parts to be installed on the clamshell die press, the accessory parts comprising:

a cutting blade set comprising a first cutting blade having a first tooth profile, and a second cutting blade having a second tooth profile, wherein the first tooth profile is different from the second tooth profile, and one of the first cutting blade or the second cutting blade is to be installed on the moving platen; and a pad set comprising a first padding block comprising a first padding layer composed of a first padding material having a first Shore value, and a second padding block comprising a second padding layer composed of a second padding material having a second Shore value, wherein the first Shore value is different from the second Shore value, one of the first padding block or the second padding block is to be mounted on a working surface of the fixed platen, the first padding block is paired with the first cutting blade, and the second padding block is paired with the second cutting blade, and the first and second Shore values represent a respective hardness measurement of the corresponding first and second padding materials.

2. The clamshell die press system of claim 1, wherein each of the first padding block and the second padding block further comprises a backing layer bonded to the first padding layer and the second padding layer, respectively, and wherein the backing layer comprises a sheet of metal.

3. The clamshell die press system of claim 2, wherein the first and second padding layers comprise at least one of Urethane, rubber, or ultra-high-molecular-weight (UHMW) polyethylene, and wherein the backing layer comprises a sheet of steel.

4. The clamshell die press system of claim 2, wherein the sheet of metal of the backing layer is magnetized steel, and wherein the first or the second padding block is bonded to the working surface of the fixed platen via magnetic force.

5. The clamshell die press system of claim 2, further comprising a double-sided magnetic layer mounted on the working surface of the fixed platen, wherein the padding block is secured, via magnetic force, to the double-sided magnetic layer that is secured, via magnetic force, to the working surface of the fixed platen.

6. The clamshell die press system of claim 1, wherein the tooth profiles associated with the first cutting blade and the second cutting blade each comprises parameters representing a tooth pitch, a gullet depth, a tooth contour shape, and a valley contour shape, and wherein one of the padding layers with a softer padding material is paired with one of the cutting blades with a larger gullet depth.

7. The clamshell die press system of claim 6, wherein the tooth profile of one of the cutting blades is to be installed on the moving platen based on a material composition of the work piece being cut by the one of the cutting blades.

8. A method comprising:

determining a material composition of a work piece to be machined on a die press device;

selecting, based on the material composition of the work piece, a first tooth profile of a first cutting blade installed on the die press device;

selecting a first padding block that comprises a first padding layer composed of a first padding material having a first Shore value wherein the first cutting blade is paired with the first tooth profile;

mounting the first padding block on a working surface of the die press device;

responsive to replacing the first cutting blade with a second cutting blade having a second tooth profile, selecting a second padding block that comprises a second padding layer composed of a second padding material having a second Shore value, wherein the second cutting blade is paired with the second tooth profile, and wherein the second Shore value is different from the first Shore value, and the second tooth profile is different from the first tooth profile; and mounting the second padding block on the working surface of the die press device.

9. The method of claim 8, further comprising operating the die press device to machine the work piece into a product.

10. The method of claim 9, wherein the tooth profiles associated with the first cutting blade and the second cutting blade each comprises parameters representing at least one of a tooth pitch, a gullet depth, a tooth contour shape, or a valley contour shape, and wherein the padding layer with a softer padding material is paired with one of the cutting blades with a larger gullet depth.

11. The method of claim 9, wherein the first padding block further comprises a backing layer bonded to the first padding layer, and wherein the backing layer comprises a sheet of metal.

12. The method of claim 11, wherein the first and second padding layers comprise at least one of Urethane, rubber, or ultra-high-molecular-weight (UHMW) polyethylene, and wherein the backing layer comprises a sheet of steel.

* * * * *